Oct. 29, 1968

G. W. STEPHENSON 3,408,096

PIPE COUPLING

Filed June 20, 1966

Inventor:
George William Stephenson
By Baldwin, Wight, Diller & Brown
Attorneys

United States Patent Office 3,408,096
Patented Oct. 29, 1968

3,408,096
PIPE COUPLING
George William Stephenson, Larbert, Scotland, assignor to Inglis & MacInnes Limited, Larbert, Scotland, a corporation of Great Britain and Northern Ireland
Filed June 20, 1966, Ser. No. 558,808
4 Claims. (Cl. 285—110)

ABSTRACT OF THE DISCLOSURE

This disclosure is directed to a pipe coupling having a deformable sealing ring mounted over juxtapositioned ends of two pipes, the sealing ring being compressible against the exterior pipe surfaces by a pair of coupling rings. Annular recess means defined by an inner surface of the sealing ring are acted upon by internal hydraulic pressure to form two seals between sealing surfaces of the sealing ring and surfaces of each pipe and coupling ring.

The subject of this invention is an improved pipe coupling by means of which adjacent ends of two plain-ended pipe lengths may be interconnected in a quick and simple manner, the coupling being capable of withstanding considerable fluid pressures within the pipe lengths when interconnected by the coupling.

A pipe coupling according to the invention comprises a main sleeve or sealing ring formed of a resiliently deformable material, two rigid end flanges each presenting a backing sleeve, and means interconnecting the end flanges and by which the end flanges may be drawn towards one another and moved apart, the main sleeve being disposed between the end flanges and within the space bounded by the backing sleeves, and the end portions of the main sleeve being so tapered and the contacting faces of the end flanges being so inclined that movement of the end flanges towards one another may result in the main sleeve being urged inwardly.

The inner surface of the main sleeve between the end faces thereof is preferably formed with an annular recess and an inwardly directed annular projection, the inner diameter of which is less than the inner diameter of the main sleeve, may be presented by the inner surface of the main sleeve between the end faces thereof.

Preferably the means by which the end flanges may be drawn towards one another and moved apart comprises a plurality of bolts each of which has a nut screw-threadedly mounted thereon, each bolt being located through axially aligned holes formed in lugs presented by the two end flanges with the head of the bolt disposed on the side of the lug presented by one of the end flanges, remote from the other of the end flanges, and with the nut which is screw-threadedly mounted on the bolt disposed on the side of the lug presented by said other of the end flanges, remote from said one of the end flanges.

The adjacent end faces of the backing sleeves may be of mating sinuous or castellated configuration.

The annular recess formed on the inner surface of the main sleeve preferably extends substantially to the tapered end portions of the main sleeve and, according to one embodiment of the invention, comprises a central portion of substantially cylindrical form and two annular groove portions which are disposed at the ends of and in communication with said central portion. Said annular groove portions may be oppositely inclined at acute angles to the longitudinal axis of the main sleeve.

In order that the invention may be more clearly understood and more readily carried into effect the same will now, by way of example, be described more fully with reference to the accompanying drawings in which.

Figure 1:
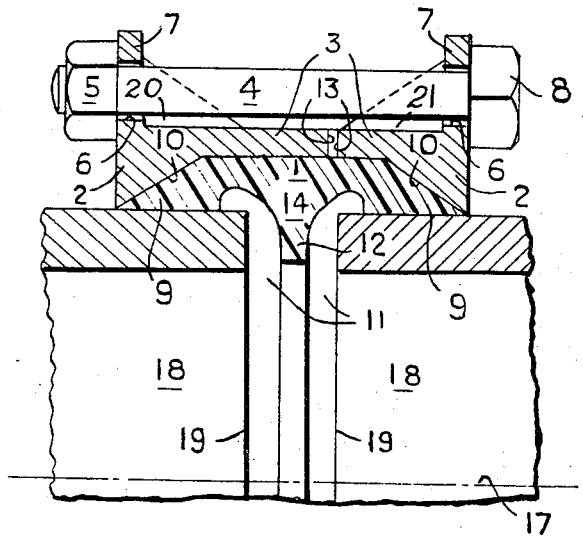
FIG. 1 is a half view in axial section of a pipe coupling according to one embodiment of the invention.
Figure 2:
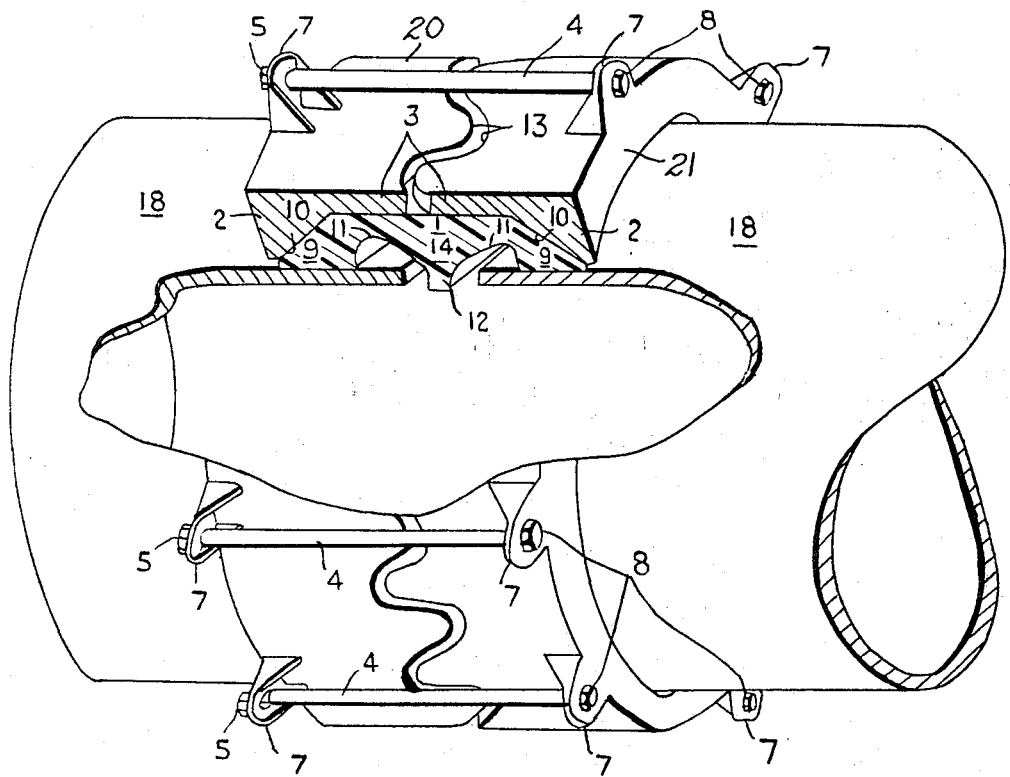
FIG. 2 is an isometric view, partly in section, of the pipe coupling illustrated in FIG. 1.

FIGS. 1 and 2 correspond to FIGS. 1 and 2, respectively, of the drawing accompanying the provisional specification.

Referring to all the figures of the drawings, in which like reference numerals denote like parts, 1 denotes a main sleeve or sealing ring which is formed of a resiliently deformable material, such as rubber or neoprene. The main sleeve or sealing ring 1 is disposed between two rigid end flanges 2 and within the space bounded by two rigid backing sleeves 3 of a pair of coupling rings 20, 21 each of which carries one of the end flanges 2. The end flanges 2 are interconnected by a plurality of bolts 4 on each of which is screw-threadedly mounted a nut 5, each bolt 4 being disposed through axially aligned holes 6 formed in lugs 7 which are rigidly presented by the two end flanges 2. The head 8 of each bolt 4 is disposed on that side, of the associated lug 7 presented by one of the end flanges 2, which is remote from the other of the end flanges 2 and the nut 5 which is screw-threadedly mounted on the bolt 4 is disposed on that side, of the associated lug 7 presented by said other of the end flanges 2, which is remote from said one of the end flanges 2.

The sealing ring or main sleeve 1 consists of a substantially cylindrical central portion 22 joined at axially opposite annular or peripheral junctures 23, 24 to outer wedge-shaped end portions 9. Contacting inner and outer surfaces of the end flanges 2 and the end portions 9 are formed with complementary inclined sealing surfaces or faces 10, 25, respectively, so that on movement of the end flanges 2 towards one another, by rotation of the nuts 5 relative to the bolts 4 in the appropriate direction, inner cylindrical sealing surfaces 27 of the end portions 9 of the main sleeve 1 are urged inwardly to provide a first seal as is hereinafter described in greater detail.

The central portion 22 of the inner surface of the main sleeve 1 is formed with annular recess means 11 which is divided into two portions by an inwardly directed annular projection or spacing member 12 which is presented by the inner surface of the main sleeve 1 and which is substantially equi distant from the ends of the main sleeve 1. For reasons which will hereinafter become evident the inner diameter of the annular projection 12 is less than the inner diameter of the main sleeve 1.

The adjacent end faces 13 of the backing sleeves 3 are of mating sinuous configuration although in alternative embodiments of the invention (not shown) the end faces 13 may be of mating castellated configuration.

Figure 3:
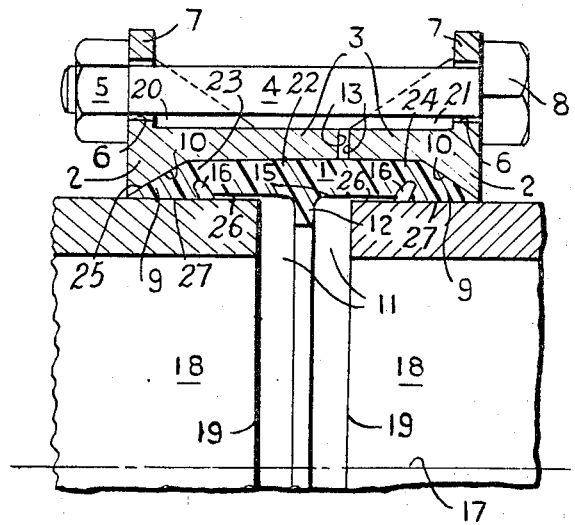
FIG. 3 is a view corresponding to FIG. 1 of a pipe coupling according to a second embodiment of the invention.

The only difference between the embodiment of the invention illustrated in FIGS. 1 and 2 and the embodiment of the invention illustrated in FIG. 3 is in the cross-sectional form of the annular recess means 11 formed on the inner surface of the main sleeve 1. With reference to the embodiment of the invention illustrated in FIGS. 1 and 2 the annular recess 11 is of a generally bulbous cross-section, the sides of the base 14 of the annular projection 12 being divergent in the direction towards the main sleeve 1 so that the two portions into which the annular recess 11 is divided by the projection 12 are of generally bulbous cross-section as shown, particularly in FIG. 1.

With reference, however, to the embodiment of the invention illustrated in FIG. 3 the annular recess means 11 formed on the inner surface of the main sleeve 1 comprises a pair of central inner surfaces 15 of substantially cylindrical form and two annular groove portions or recesses 16 which are disposed at the ends of and in communication with axially extending annular passages 26, 26 defined between each of the inner surfaces 15 and outer surfaces (unnumbered) of a pair of pipe end portions 18, 18. The annular groove portions 16 are oppositely inclined at acute angles to the longitudinal axis 17 of the main sleeve 1 so as to be divergent in the direction from the longitudinal axis 17 of the main sleeve 1 with the annular projection 12 which divides the annular recess means 11 into two portions being disposed substantially centrally of said pair of central inner surfaces 15. The annular groove portions 16 are disposed substantially at the junctures 23, 24 of the end portions 9 with the central portion 22 of the main sleeve 1 and the annular groove portions 16 are, furthermore, formed in the main sleeve 1 to the maximum depth possible without excessively weakening the annular junctures 23, 24 of the main sleeve 1 through which the end portions 9 are connected to the central portion 22 of the main sleeve 1.

To assemble the pipe coupling with reference again to all the figures of the drawing, the adjacent end portions 18 of two pipe lengths to be interconnected are brought into coaxial relationship and the main sleeve 1 is mounted on the adjacent end portions 18 with the annular projectilon 12 disposed between the end faces 19 of the end portions 18 thereby to maintain the end faces 19 in the correct spaced relationship. The end flanges 2 which have previously been positioned one on each of the end portions 18 of the pipe lengths are then brought towards one another and are interconnected by the bolts 4 and nuts 5. Drawing together of the end flanges 2 by rotation of the nuts 5 relative to the bolts 4 in the appropriate direction causes the tapered end portions 9 of the main sleeve 1 to be resiliently deformed inwardly by the action thereon of the inclined faces 10, 25 of the end flanges 2 to bring the sealing surfaces 27 into fluid tight sealing engagement with the exterior surfaces (unnumbered of the pipe end portions 18.

When pressure fluid, which as will be understood may be either a liquid or gaseous medium, flows through the pipe lengths the fluid flows past the annular projection 12 presented by the main sleeve 1 and enters the annular passages 26 and the groove portions 16. The pressure fluid within the passages 26 and the groove portions 16 respectively, urges the main sleeve 1 against the backing sleeves 3 and also serves further resiliently to deform the end portions 9 of the main sleeve 1 into fluid tight sealing engagement between the end portions 18 of the pipe lengths and the end flanges 2 to form a second seal between the surfaces 10, 25. Ideally the adjacent end faces 13 of the backing sleeves 3 should be in abutting engagement when the coupling is fully tightened but in practice it is preferable that when the coupling is fully tightened the end faces 13 are spaced apart a small distance of say $\frac{1}{16}$ to $\frac{1}{8}$ inch to ensure that the coupling may be fully tightened irrespective of variations, within the manufacturing tolerances, in the dimensions of the pipe lengths being interconnected and in the components of the coupling.

Since, with reference to the embodiment of the invention illustrated in FIG. 3, the annular recess means 11 formed on the inner surface of the main sleeve 1 extends substantially to the junctions of the tapered end portions 9 of the main sleeve 1 with the remainder of the main sleeve 1 frictional resistance between the inner and outer surfaces of said remainder of the main sleeve 1 and the end portions 18 of the pipe lengths and the backing sleeves 3, respectively, is substantially eliminated thereby permitting pressure fluid on entering the annular recess means 11 so resiliently to deform the end portions 9 of the main sleeve 1 as to ensure that substantially no fluid leakage from the coupling occurs. Furthermore since the annular groove portions 16 are formed in the main sleeves 1 to the maximum depth possible any tendency, should relative axial movement between the adjacent end portions 18 of the pipe lengths and the main sleeve 1 occur, for the end portions 9 of the main sleeve 1 to be mechanically restrained in a condition in which fluid leakage through the coupling may result is minimized.

In effect, therefore, the coupling of this invention presents a sealing ring 1 which is precompressed by the action of the coupling rings 20, 21 on the wedge-shaped portion 9 of the sealing ring 1 to provide an initial seal between the surfaces 27 and the exterior surfaces of the pipe end portions 18 as well as a seal between the surfaces 10, 25 which are both increased by internal hydraulic pressure, thus maintaining two effective seals at opposite axial ends of the coupling. The sealing ring is shaped to act as a double O-ring, one on each pipe end portion, once internal hydraulic pressure has been applied while maintaining sufficient interface pressure on the rough pipe exterior surfaces to prevent leakage when hydrostatic effects are insignificant.

It is an advantage of a pipe coupling according to this invention that when the coupling is in use angular or axial displacement, within predetermined limits, of the end portions 18 of the pipe lengths does not result in fluid leakage through the coupling.

The embodiment of the invention illustrated in FIGS. 1 and 2 of the drawings has been found to be most suitable for the smaller joint sizes while the embodiment of the invention illustrated in FIG. 3 of the drawings has been found to be most suitable for the larger joint sizes. More specifically, tests, in which the fluid pressure was 400 p.s.i., have indicated that the embodiment of the invention illustrated in FIGS. 1 and 2 is most suitable where the joint sizes are from 3 to 14 inches nominal bore and that the embodiment of the invention illustrated in FIG. 3 is most suitable where the joint sizes are from 15 to 24 inches nominal bore.

What is claimed is:

1. A pipe coupling comprising a sealing ring of resilient deformable material mountable over juxtapositioned ends of two pipes to be coupled together, said sealing ring including a substantial cylindrical central portion joined at axially opposite annular junctures thereof to generally conical shaped edge portions, a pair of interconnectible coupling rings each presenting a backing sleeve for fitting over the central portion of the sealing ring and an end flange conically shaped for abutment against an associated one of each of the conical shaped edge portions of the sealing ring, said conical shaped edge portions having radially innermost first sealing surfaces for sealingly embracing exterior surfaces of the pipes which are to be coupled together, means for interconnecting the coupling rings and drawing the same together to deform the conical shaped edge portions and urge each of said first sealing surfaces into intimate sealing engagement with an associated exterior pipe surface, annular recess means defined by an inner surface of said sealing ring for directing internal hydraulic pressure against the conical shaped edge portions to urge the same outwardly against the end flanges to form with each a second seal, said annular recess means being defined by an annular recess located immediately adjacent to but axially inwardly of each annular junction, said recesses being convergently inclined in the direction of the coupling axis and has been inserted, opening in a generally radially inward direction, the openeings of said annular recesses being spaced axially outwardly of the pipe ends, and generally cylindrical surface means disposed radially outward of said first sealing surfaces and intersecting the axially inner walls of said annular recesses and extending axially inwardly therefrom between said annular recesses for forming with each exterior pipe surface an annular passage for directing fluid pressure axially into each annular recess for urging the conical shaped edge portions outwardly against said end flanges to form said second seals.

2. The pipe coupling as defined in claim 1 wherein said cylindrical central portion includes an inwardly directed annular spacing member having an inner diameter which is less than the inner diameter of said first sealing surfaces.

3. The pipe coupling as defined in claim 1 wherein said backing sleeves include axially opposed end faces of mating sinusoidal configurations.

4. The pipe coupling as defined in claim 1 wherein said interconnecting means are a plurality of bolts each provided with a nut threadably mounted thereon, said coupling rings each being provided with a plurality of lugs, each of said lugs being provided with a hole, the holes in said lugs of one of said coupling rings being axially aligned with the holes in the other of said coupling rings, and said bolts being located in said aligned holes.

References Cited

UNITED STATES PATENTS

| 406,035 | 1/1889 | Dresser | 285—383 X |
| 1,499,050 | 6/1924 | Broome | 285—330 X |
| 1,948,274 | 2/1934 | McMurray | 285—337 X |
| 3,082,022 | 3/1963 | Moore | 285—112 |
| 3,291,506 | 12/1966 | Blakeley | 285—112 |

FOREIGN PATENTS

| 543,404 | 5/1956 | Italy. |
| 681,662 | 10/1952 | Great Britain. |

CARL W. TOMLIN, *Primary Examiner.*

THOMAS CALLAGHAN, *Assistant Examiner.*